J. HOLLINGSWORTH.
Horse Rake.

No. 90,362. Patented May 25, 1869.

Witnesses:

Inventor:
James Hollingsworth
Per
D. T. H. Alexander.
Atty.

United States Patent Office.

JAMES HOLLINGSWORTH, OF CHICAGO, ILLINOIS.

IMPROVEMENT IN HORSE-RAKES.

Specification forming part of Letters Patent No. 90,362, dated May 25, 1869.

*To all whom it may concern:*

Be it known that I, JAMES HOLLINGSWORTH, of Chicago, in the county of Cook and State of Illinois, have invented certain new and useful Improvements in Horse-Rakes; and I do hereby declare that the following is a full, clear, and exact description thereof, reference being had to the accompanying drawings, and to the letters of reference marked thereon, which form a part of this specification, and in which—

Figure 1:
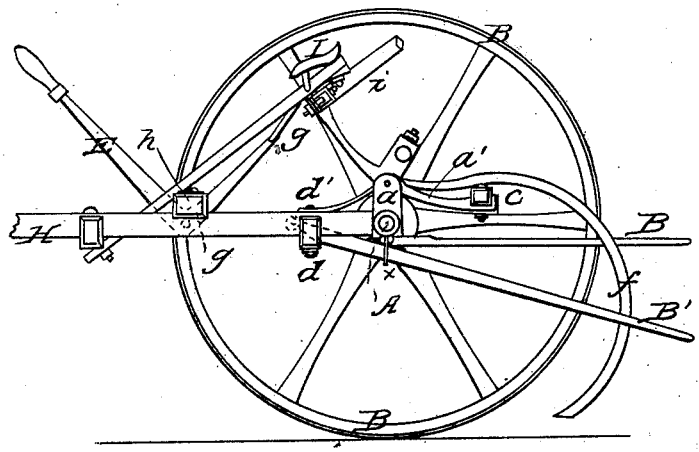
Figure 2:
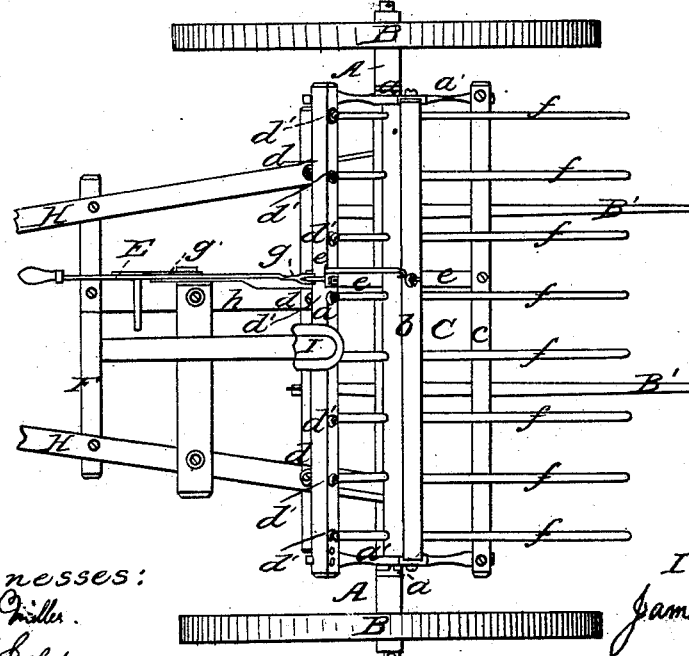

Figure 1 represents a side elevation of my horse hay-rake, and Fig. 2 a plan view of the same.

Similar letters indicate like parts in both figures.

My invention relates to improvements in horse-rakes; and to this end it consists in the employment of a pivoted frame on the axle-tree, provided with slots and adjustable screws, to receive the rake-teeth, which are flattened at one end, in combination with such other devices the peculiarity of which will be hereinafter fully set forth.

To enable others skilled in the art to which my invention appertains to make and use the same, I will now describe its construction and operation.

In the accompanying drawings, A represents the axle-tree, and B the wheels. On the axle-tree, inside the wheels, are secured the metal projections $a\ a$. In these projections is pivoted the frame C, consisting of three parallel bars, $a\ b\ c$, united together at suitable distance apart by the metal rockers $a'\ a'$, made as seen in the drawings, and secured to the ends of the bars. The bar $a$ is grooved on its lower surface to admit the solid part of the eyebolts $d\ d\ d$ to enter below the outer surface of the wood, so that the eye of the bolt will gripe the tooth before it strikes the bottom of the groove and press the tooth firmly to the outer surface of the wood. The eyebolts $d\ d\ d$ are secured to the bar $a$ by nuts $d'\ d'\ d'$. The center bar, $b$, of the rocking frame C is formed with notches on its lower surface, to receive the rake-teeth.

$f\ f\ f$ represent the rake-teeth, made as seen in the drawings, and flattened at their inner ends. The rake-teeth are passed over the bar $c$, under the center bar, $b$, in the notches, and the flattened end secured in the eyebolts by the nuts $d'\ d'\ d'$.

B' B' represent the strippers or cleaners, which are secured at their front ends to the rear cross-piece of the shafts and work in a staple and spiral spring, $x$, attached to the lower surface of the axle-tree. These strippers are intended to clean the hay or straw from the rake-teeth, which is done by raising and lowering the rocking frame C.

$e$ is a metal strap, secured to the rocking frame, as seen in Fig. 2. The end of this strap is formed with a small projection, $e'$, to which is pivoted the rod $g$. The lower end of this rod is attached to the hand-lever E, which consists of a metal bar bent so as to form a right angle at its lower end, and is pivoted at its vertex to the metal plate $g'$, secured to the brace $h$, which connects the two cross-pieces F G of the shafts H H.

$i$ is an upright bar, secured on the bar $a$, to retain the hand-lever in position when the rake-teeth are raised.

I represents the driver's seat.

Having thus described my invention, what I claim as new, and desire to secure by Letters Patent, is—

1. The eyebolts $d\ d\ d$, in combination with the nuts $d'\ d'\ d'$ and flattened teeth $f\ f\ f$, for the purpose of adjusting the teeth to smooth or rough ground, substantially as specified.

2. Grooving the under side of forward piece, $a$, when said piece is used in combination with eyebolts $d\ d\ d$ and teeth $f\ f\ f$, operating substantially as and for the purpose specified.

3. The strippers or cleaners B' B', in combination with spiral spring $x$, substantially as described.

4. The combination of rocking frame C, rake-teeth $f\ f\ f$, eyebolts $d\ d\ d$, and nuts $d'\ d'\ d'$ with hand-lever E, all combined, arranged, and operating substantially in the manner and for the purpose set forth.

In testimony that I claim the foregoing as my own I affix my signature in presence of two witnesses.

JAMES HOLLINGSWORTH.

Witnesses:
EUGENE P. MORSE,
JOHN H. MAHAN.